(12) United States Patent
Pallini et al.

(10) Patent No.: US 10,801,546 B2
(45) Date of Patent: Oct. 13, 2020

(54) BALL BEARING CAM FOLLOWER FOR AN ADJUSTABLE AIRCRAFT SEAT

(71) Applicant: Roller Bearing Company of America, Inc., Oxford, CT (US)

(72) Inventors: Robert Pallini, Cheltenham, PA (US); Michael Coppola, Naugatuck, CT (US)

(73) Assignee: Roller Bearing Company of America, Inc., Oxford, CT (US)

(*) Notice: Subject to any disclaimer, the term of this patent is extended or adjusted under 35 U.S.C. 154(b) by 0 days.

(21) Appl. No.: 16/001,134

(22) Filed: Jun. 6, 2018

(65) Prior Publication Data

US 2018/0355913 A1    Dec. 13, 2018

Related U.S. Application Data

(60) Provisional application No. 62/516,244, filed on Jun. 7, 2017.

(51) Int. Cl.
| | | |
|---|---|---|
| *F16C 19/16* | (2006.01) | |
| *F16C 33/60* | (2006.01) | |
| *F16H 53/06* | (2006.01) | |
| *F16C 13/00* | (2006.01) | |
| *F16C 33/58* | (2006.01) | |

(52) U.S. Cl.
CPC .......... *F16C 19/166* (2013.01); *F16C 13/006* (2013.01); *F16C 19/16* (2013.01); *F16C 33/583* (2013.01); *F16C 33/60* (2013.01); *F16H 53/06* (2013.01); *F16C 33/585* (2013.01); *F16C 2361/00* (2013.01)

(58) Field of Classification Search
CPC .... F16C 13/006; F16C 19/166; F16C 33/583; F16C 33/585; F16C 33/60; F16H 53/06

USPC ................... 384/58; 19/94 R, 96 R
See application file for complete search history.

(56) References Cited

U.S. PATENT DOCUMENTS

| | | | |
|---|---|---|---|
| 1,782,622 A | | 11/1930 | Kilian |
| 2,076,239 A | | 4/1937 | Lemmon |
| 2,796,626 A | * | 6/1957 | Gussack ............. E05D 15/0634 |
| | | | 16/94 R |
| 3,586,396 A | | 6/1971 | Barr et al. |
| 3,588,206 A | | 6/1971 | Frost |
| 3,978,566 A | | 9/1976 | Ladin |
| 4,707,030 A | | 11/1987 | Harding |
| 4,729,196 A | | 3/1988 | Chaseling |
| 5,531,503 A | | 7/1996 | Hughes |

(Continued)

FOREIGN PATENT DOCUMENTS

| | | |
|---|---|---|
| EP | 2042759 A2 | 4/2009 |
| EP | 1840395 B1 | 4/2013 |

(Continued)

OTHER PUBLICATIONS

Extended European Search Report issued in corresponding EP Application No. 18176503.3, dated Sep. 26, 2018, pp. 1-10.

*Primary Examiner* — James Pilkington
(74) *Attorney, Agent, or Firm* — Murtha Cullina LLP (57) ABSTRACT

A cam follower assembly includes a ball bearing having an outer ring and an inner assembly which includes two or more segments. The inner assembly is disposed in the outer ring with a full complement of balls disposed therebetween. The outer ring and inner assembly each include a race having a gothic arch cross sectional configuration that causes the balls to roll on two portions of each race.

9 Claims, 8 Drawing Sheets

(56) References Cited

U.S. PATENT DOCUMENTS

| | | | |
|---|---|---|---|
| 6,010,420 A | 1/2000 | Niki et al. | |
| 6,336,247 B1 * | 1/2002 | Schnoor | E05D 15/0634 16/105 |
| 6,883,457 B2 * | 4/2005 | Lipscombe | B60F 3/003 114/363 |
| 7,188,542 B2 | 3/2007 | Yabe et al. | |
| 7,325,974 B2 * | 2/2008 | Tanabe | F16C 19/166 384/457 |
| 7,695,225 B2 | 4/2010 | Pozzi | |
| 8,132,330 B2 | 3/2012 | Schroeder | |
| 8,499,457 B2 | 8/2013 | Kobayashi et al. | |
| 8,727,440 B1 | 5/2014 | Giasson et al. | |
| 9,004,429 B2 * | 4/2015 | Dennison | A47H 1/04 16/94 D |
| 2005/0037877 A1 | 2/2005 | Ishiguro et al. | |
| 2009/0080816 A1 | 3/2009 | Schroeder | |
| 2010/0201172 A1 | 8/2010 | Hudswell et al. | |
| 2010/0260446 A1 | 10/2010 | Schroeder | |
| 2011/0210166 A1 | 9/2011 | Dinh | |
| 2015/0274053 A1 | 10/2015 | Carlioz et al. | |

FOREIGN PATENT DOCUMENTS

| | | |
|---|---|---|
| WO | 2006100846 A1 | 9/2006 |
| WO | 2018025591 A1 | 2/2018 |

\* cited by examiner

BALL BEARING CAM FOLLOWER FOR AN ADJUSTABLE AIRCRAFT SEAT

CROSS REFERENCE TO RELATED APPLICATIONS

This application is a non-provisional application of, and claims priority to, U.S. Provisional Application No. 62/516,244, entitled "Ball Bearing Cam Follower For An Adjustable Aircraft Seat", filed on Jun. 7, 2017, the entirety of which is incorporated by reference herein.

FIELD OF THE INVENTION

This invention relates to a cam follower for an adjustable aircraft seat and more particularly to a cam follower having a ball bearing that has a full complement of balls and an outer ring and inner assembly that each have a gothic arch bearing surface thereon, that is configured to accommodate misalignment of a track that the ball bearing travels in. The present invention also includes a method for assembling a cam follower.

BACKGROUND

Cam follower assemblies are used in many industrial manufacturing and conveying applications. The cam follower assemblies include a rolling bearing having an outer ring disposed around an inner ring with a plurality of rolling elements, typically needle rollers or balls, disposed in a cavity therebetween. In the case of ball bearing cam followers, it can be difficult to assemble cam follower because of limited space between the outer ring and inner ring for receiving the rolling elements. Typically, less than a full complement of balls is employed to provide space between the outer ring and inner ring for inserting the balls therebetween. When less than a full complement of balls is employed, the balls do not engage each other and there can be uneven spaces between the rolling elements. Typically, spacer rings are employed to evenly space the balls apart from one another. In addition, when less than a full complement of balls is employed the load capacity of the ball bearing is less than a comparable bearing using a full complement of balls. An annular seal is positioned on each axial end thereof, between the inner ring and the outer ring to keep debris from entering the cavity. The seals occupy an axial length of the cam follower assemblies and the yoke roller assemblies Cam follower assemblies are subject to asymmetric loads when used in various applications causing misalignment between the cam follower and the surface it rolls on. The life and performance of the cam follower assemblies can be reduced as a result of the asymmetric loads and resulting misalignment. Cam followers are sometimes used in adjustable seats for aircraft. Use of the seats by people can impart the asymmetric loads on the cam follower due to misalignment of the seat structure relative to the cam follower.

Typically, standard needle roller cam followers are limited in handling side loads.

Thus, there is a need for an improved ball bearing cam follower that can overcome the foregoing problems associated with asymmetric loads, misalignment and assembly.

SUMMARY

There is disclosed herein a cam follower assembly that has a ball bearing disposed thereon. The ball bearing includes an outer ring that has an interior area which is defined by an inner surface extending between a first axial end and a second axial end of the outer ring. The inner surface has a first radially inward facing bearing surface and a second radially inward facing bearing surface. The inner surface also has a radially outward extending and inwardly facing first recessed surface located between the first radially inward facing bearing surface and a second radially inward facing bearing surface. The ball bearing includes an inner assembly that extends into the interior area of the outer ring. The inner assembly includes a first inner segment extending from a third axial end to a fourth axial end thereof; and a second inner segment extending from a fifth axial end to a sixth axial end thereof. The first inner segment has a first radially outward facing bearing surface and the second inner segment has a second radially outward facing bearing surface. The fourth axial end and the fifth axial end are abutted against each other. The inner assembly has a radially inward extending and radially outward facing second recessed surface located between the first radially outward facing bearing surface and the second radially outward facing bearing surface. A plurality balls is positioned in the interior area between the outer ring and the inner assembly. The balls are in rolling engagement with the first radially inward facing bearing surface and the second radially inward facing bearing surface of the outer ring. The balls are also in rolling engagement with the first radially outward facing bearing surface and the second radially outward facing bearing surface of the inner assembly. The plurality of balls rollingly engaging each other and are spaced apart from the first recessed surface and the second recessed surface. The cam follower assembly includes a shaft that has a bearing receiving portion and a mounting portion extending from the bearing receiving portion. The ball bearing is disposed on the bearing receiving portion such that the inner assembly is secured to the shaft.

In one embodiment, the cam follower has a shoulder positioned between the bearing receiving portion and the mounting portion. The shoulder extends radially outward from and circumferentially around the shaft. The second inner segment of the inner assembly abuts an axial face of the shoulder. The first inner segment is secured to the shaft, for example, by swaging, staking, pinning, a thermal fit and/or an interference press fit.

In one embodiment, the outer ring has a crowned exterior surface, for example, an arcuate shape having a radius of curvature.

In one embodiment, the ball bearing has one or more seals extending between the outer ring and the inner assembly.

In one embodiment, the mounting portion has a male threaded area thereon or a female threaded area therein.

In one embodiment, each of the plurality of balls has a radius that extends from a center of the ball. The centers of the balls trace a reference circle around the inner assembly. The centers of the balls are aligned along a common radially extending reference plane. The first radially inward facing bearing surface has a first radius of curvature that extend from a first origin located radially inward from the reference circle and axially offset from the reference plane towards the second inner segment. The second radially inward facing bearing surface having a second radius of curvature that extends from a second origin located radially inward from the reference circle and axially offset from the reference plane towards the first inner segment, such that the first recessed surface, the first radially inward facing bearing surface and the second radially inward facing bearing surface form a first gothic arch cross sectional configuration.

The first radially outward facing bearing surface has a third radius of curvature extending from a third origin located radially outward from the reference circle and axially offset from the reference plane towards the second inner segment. The second radially outward facing bearing surface has a fourth radius of curvature that extends from a fourth origin located radially outward from the reference circle and axially offset from the reference plane towards the first inner segment, such that the second recessed surface, the first radially outward facing bearing surface and the second radially outward facing bearing surface form a second gothic arch cross section configuration. The first gothic arch and the second gothic arch are configured to accommodate external loads applied to the ball bearing due to misalignment.

There is further disclosed herein a track roller bearing assembly that includes a frame and a cam follower assembly. The frame includes a base section that has a first side and a second side opposite the first side. The frame includes a connection section that extends outwardly from the first side. The connection section has one or more legs that can form a channel for receiving a rail of an adjustable aircraft seat. The frame includes a track that extends from the second side. The track has a first bearing containment member and a second bearing containment member that extends outwardly from the second side. The first bearing containment member and the second bearing containment member are spaced apart from one another creating a cavity for receiving a ball bearing therein. The first bearing containment member has a leg that has a extending therefrom which has a rolling engagement surface thereon. The rolling engagement surface is substantially parallel to and faces the second side. The second bearing containment member has an opening extending therethrough. The track roller bearing assembly includes a cam follower assembly. The cam follower assembly has a ball bearing disposed thereon. The ball bearing includes an outer ring that has an interior area which is defined by an inner surface extending between a first axial end and a second axial end of the outer ring. The inner surface has a first radially inward facing bearing surface and a second radially inward facing bearing surface. The inner surface also has a radially outward extending and inwardly facing first recessed surface located between the first radially inward facing bearing surface and a second radially inward facing bearing surface. The ball bearing includes an inner assembly that extends into the interior area of the outer ring. The inner assembly includes a first inner segment extending from a third axial end to a fourth axial end thereof; and a second inner segment extending from a fifth axial end to a sixth axial end thereof. The first inner segment has a first radially outward facing bearing surface and the second inner segment has a second radially outward facing bearing surface. The fourth axial end and the fifth axial end are abutted against each other. The inner assembly has a radially inward extending and radially outward facing second recessed surface located between the first radially outward facing bearing surface and the second radially outward facing bearing surface. A plurality balls is positioned in the interior area between the outer ring and the inner assembly. The balls are in rolling engagement with the first radially inward facing bearing surface and the second radially inward facing bearing surface of the outer ring. The balls are also in rolling engagement with the first radially outward facing bearing surface and the second radially outward facing bearing surface of the inner assembly. The plurality of balls rollingly engaging each other and are spaced apart from the first recessed surface and the second recessed surface. The cam follower assembly includes a shaft that has a bearing receiving portion and a mounting portion extending from the bearing receiving portion. The ball bearing is disposed on the bearing receiving portion such that the inner assembly is secured to the shaft.

In one embodiment, the cam follower has a shoulder positioned between the bearing receiving portion and the mounting portion. The shoulder extends radially outward from and circumferentially around the shaft. The second inner segment of the inner assembly abuts an axial face of the shoulder. The first inner segment is secured to the shaft, for example, by swaging, staking, pinning, a thermal fit and/or an interference press fit.

In one embodiment, the outer ring has a crowned exterior surface, for example, an arcuate shape having a radius of curvature.

In one embodiment, the ball bearing has one or more seals extending between the outer ring and the inner assembly.

In one embodiment, the mounting portion has a male threaded area thereon or a female threaded area therein.

In one embodiment, each of the plurality of balls has a radius that extends from a center of the ball. The centers of the balls trace a reference circle around the inner assembly. The centers of the balls are aligned along a common radially extending reference plane. The first radially inward facing bearing surface has a first radius of curvature that extend from a first origin located radially inward from the reference circle and axially offset from the reference plane towards the second inner segment. The second radially inward facing bearing surface having a second radius of curvature that extends from a second origin located radially inward from the reference circle and axially offset from the reference plane towards the first inner segment, such that the first recessed surface, the first radially inward facing bearing surface and the second radially inward facing bearing surface form a first gothic arch cross sectional configuration. The first radially outward facing bearing surface has a third radius of curvature extending from a third origin located radially outward from the reference circle and axially offset from the reference plane towards the second inner segment. The second radially outward facing bearing surface has a fourth radius of curvature that extends from a fourth origin located radially outward from the reference circle and axially offset from the reference plane towards the first inner segment, such that the second recessed surface, the first radially outward facing bearing surface and the second radially outward facing bearing surface form a second gothic arch cross section configuration. The first gothic arch and the second gothic arch are configured to accommodate external loads applied to the ball bearing due to misalignment.

There is further disclosed herein a method for assembling a cam follower. The method includes providing an outer ring, an inner assembly having at least two inner segments, a plurality of balls and a shaft having a shoulder formed thereon. Each of the outer ring and the two inner segments has a gothic arch shaped bearing surface therein. The method includes disposing the second inner segment in the outer ring. The method includes installing a full complement of balls between the outer ring and the second inner segment so that the balls engage a portion of the bearing surface. The method includes disposing the first inner segment in the outer ring so that the balls are retained between the outer ring and the inner assembly and so that the balls engage the first radially outward facing bearing surface. The method includes disposing the outer ring and inner assembly with the full complement of balls therein on the shaft such that the second inner segment engages the shoulder and the first inner segment and the second inner segment abut against each other. The method includes securing first inner segment to the shaft.

DETAILED DESCRIPTION OF THE INVENTION

Figure 1:
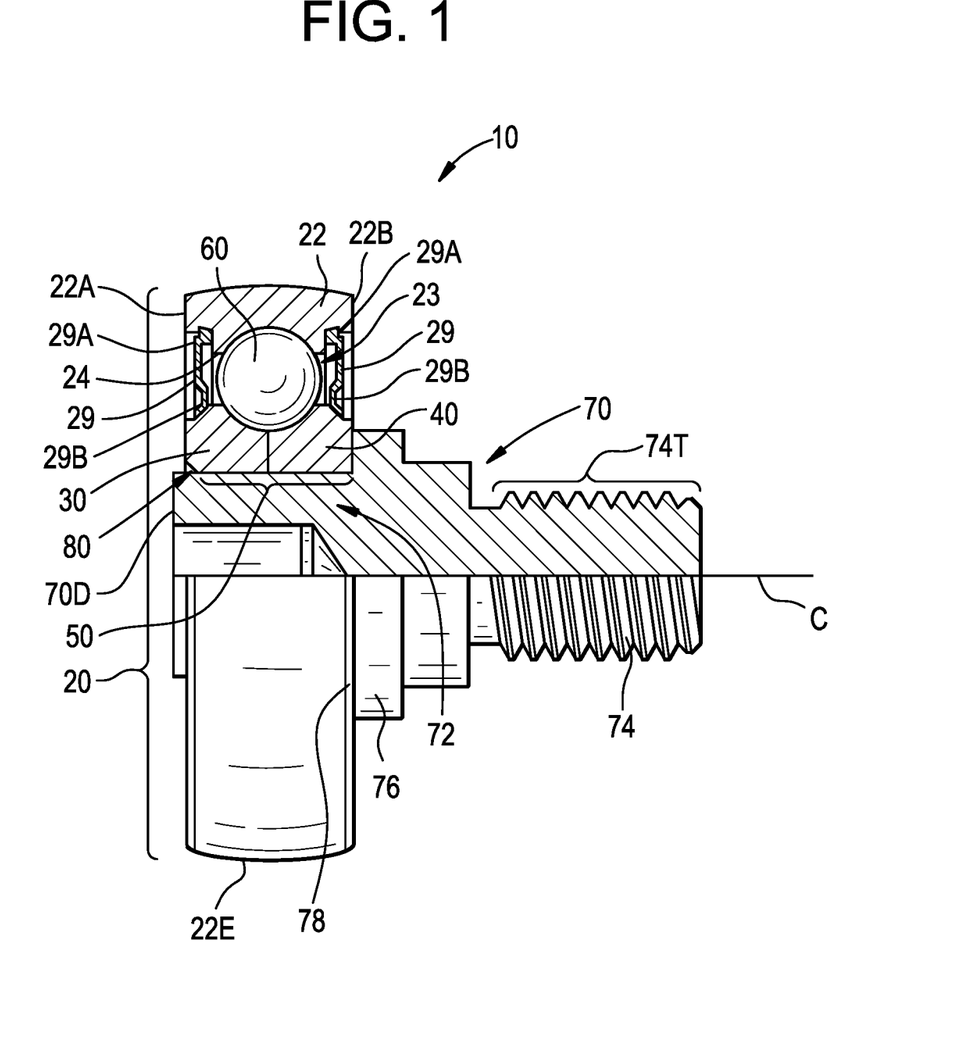
FIG. 1 is a split cross sectional and front view of the cam follower assembly of the present invention.
Figure 2:
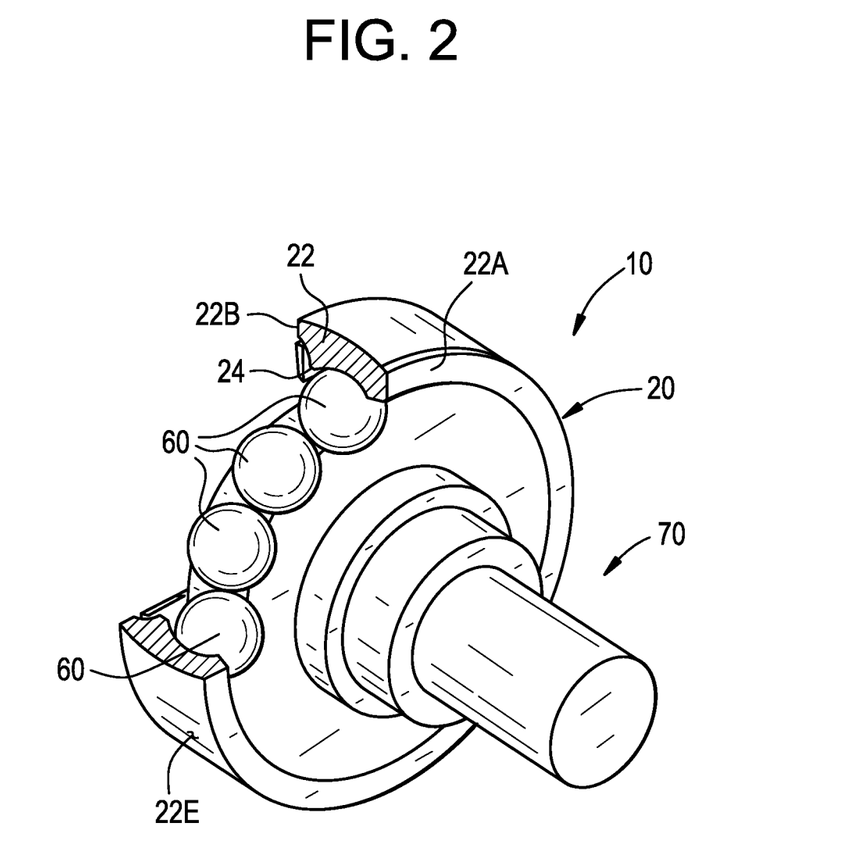
FIG. 2 is a perspective view of the cam follower assembly of FIG. 1 with a portion cut away to show a plurality of balls therein.
Figure 3:
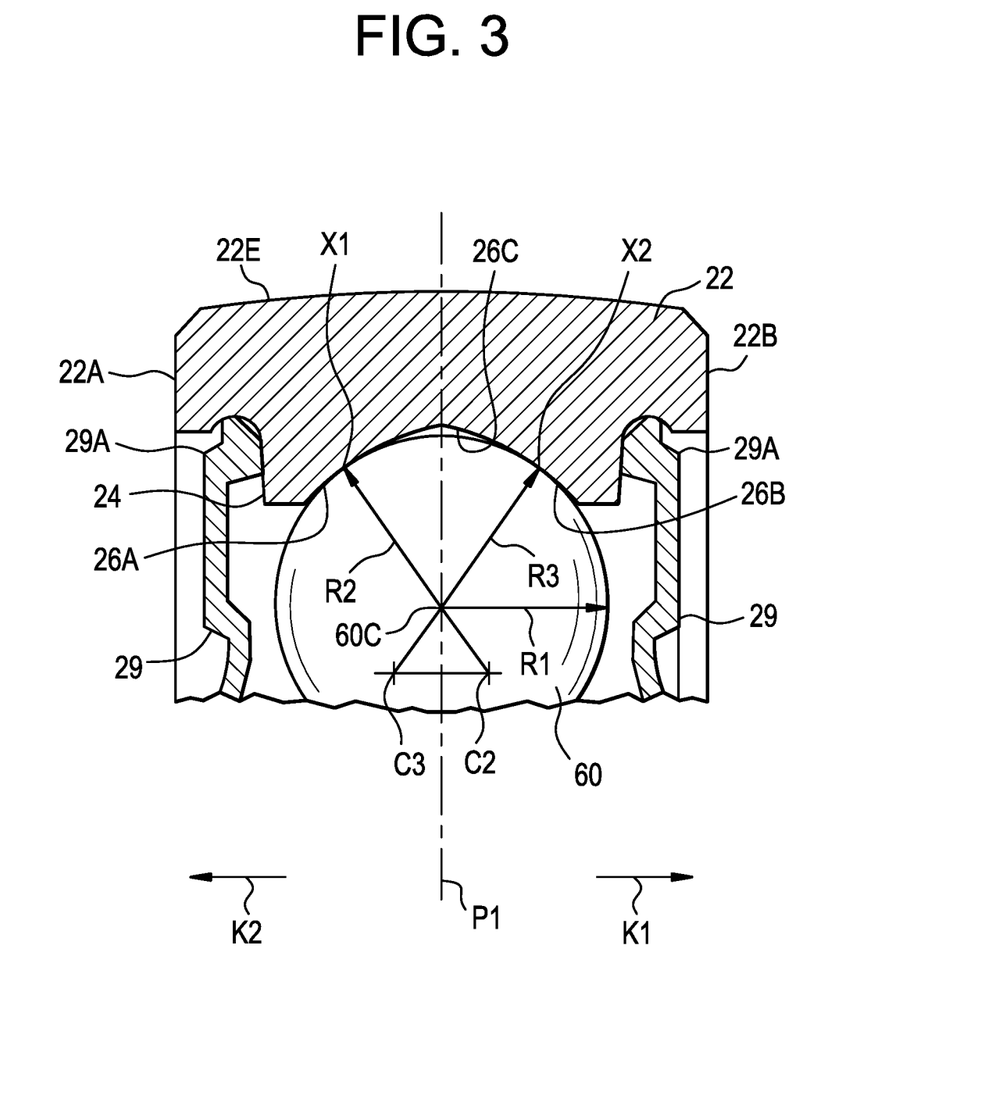
FIG. 3 is an enlarged view of an outer ring and a portion of a ball of a ball bearing employed in the cam follower assembly of the present invention.

Referring to FIGS. 1 and 2, a cam follower assembly is generally designated by the numeral 10. The cam follower assembly 10 includes a ball bearing 20. The ball bearing 20 includes an outer ring 22 having an interior area 23. The interior area 23 is defined by an inner surface 24 extending between a first axial end 22A and a second axial end 22B of the outer ring 22. As best shown in FIG. 3, the inner surface 24 has a first radially inward facing bearing surface 26A and a second radially inward facing bearing surface 26B and a radially outward extending and inwardly facing first recessed surface 26C therebetween.

Figure 4:
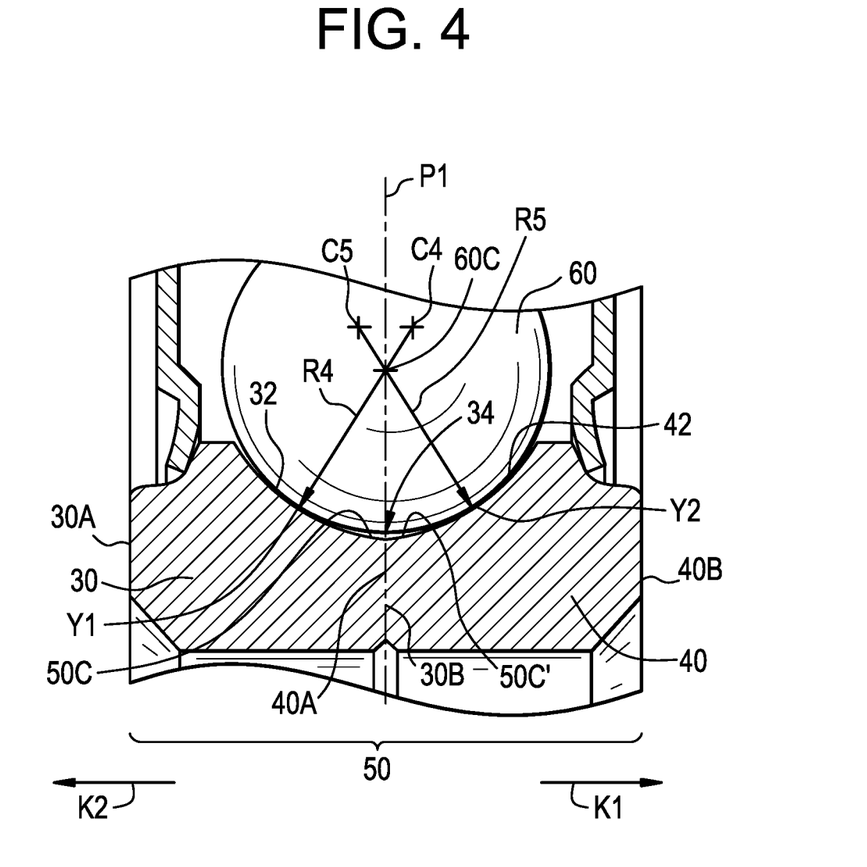
FIG. 4 is an enlarged view of an inner assembly and a portion of a ball of a ball bearing employed in the cam follower assembly of the present invention.

As shown in FIG. 1 the ball bearing 20 includes an inner assembly 50 that extends into (e.g., is disposed in) the interior area 23 of the outer ring 22. As best shown in FIG. 4, the inner assembly 50 includes a first inner segment 30 that extends from a third axial end 30A to a fourth axial end 30B thereof. The inner assembly 50 also includes a second inner segment 40 that extends from a fifth axial end 40A to a sixth axial end 40B thereof. The first inner segment 30 has a first radially outward facing bearing surface 32 and the second inner segment 40 has a second radially outward facing bearing surface 42. The fourth axial end 30B and the fifth axial end 40A are abutted against each other and form a juncture 34. A radially inward extending and radially outward facing second recessed surface 50C, 50C' are formed between the first radially outward facing bearing surface 32 and the second radially outward facing bearing surface 42.

As shown in FIGS. 1, 3 and 4, in one embodiment, the ball bearing 20 includes a seal 29 that extends between the outer ring 22 and the inner assembly 50. As best seen in FIG. 1, the seal 29 includes an anchor portion 29A that is secured to the outer ring 22 and a sealing portion 29B that slidingly engages the inner assembly 50.

As shown in FIGS. 1 and 2, a plurality of balls 60 (i.e., a full complement of spherical balls) is positioned in the interior area 23 in rolling engagement with the first radially inward facing bearing surface 26A and the second radially inward facing bearing surface 26B and the first radially outward facing bearing surface 32 and the second radially outward facing bearing surface 42. The plurality of balls 60 are positioned between the outer ring 22 and the inner assembly 50. The plurality of balls 60 rollingly engage each other to form the full complement of balls with no spacers or gaps between the balls 60 to increase load capacity of the ball bearing 20 compared to other ball bearings having less than a full complement of balls. The balls 60 are spaced apart from the first recessed surface 26C and the second recessed surface 50C, 50C' such that rolling of the balls 60 is not interrupted or otherwise disturbed by the juncture 34.

As shown in FIGS. 1 and 2, the cam follower assembly 10 includes a shaft 70 having a bearing receiving portion 72 and a mounting portion 74 extending from the bearing receiving portion 72. In one embodiment the mounting portion 74 includes a threaded area 74T (e.g., male thread as shown or a female thread, not shown, inside the mounting portion 74). The ball bearing 20 is disposed on the bearing receiving portion 72 such that the inner assembly 50 is secured to the shaft 70. The shaft 70 includes a shoulder 76 positioned between the bearing receiving portion 72 and the mounting portion 74. The shoulder 76 extends radially outward from and circumferentially around the shaft 70. The sixth axial end 40B of the second inner segment 40 abuts an axial face 78 of the shoulder 76.

As shown in FIG. 1, the first inner segment 30 is secured to the shaft 70 proximate a distal end 70D thereof, by staking. The second inner segment 40 is secured against the axial face 78 of the shoulder 76 by the first inner segment 30 being abutted against the second inner segment 40. While the first inner segment 30 is shown and described as being secured to the shaft 70 by staking, the present invention is not limited in this regard as the first inner segment 30 may be secured to the shaft 70 by swaging, staking, pinning, a thermal fit and/or an interference press fit.

Figure 8:
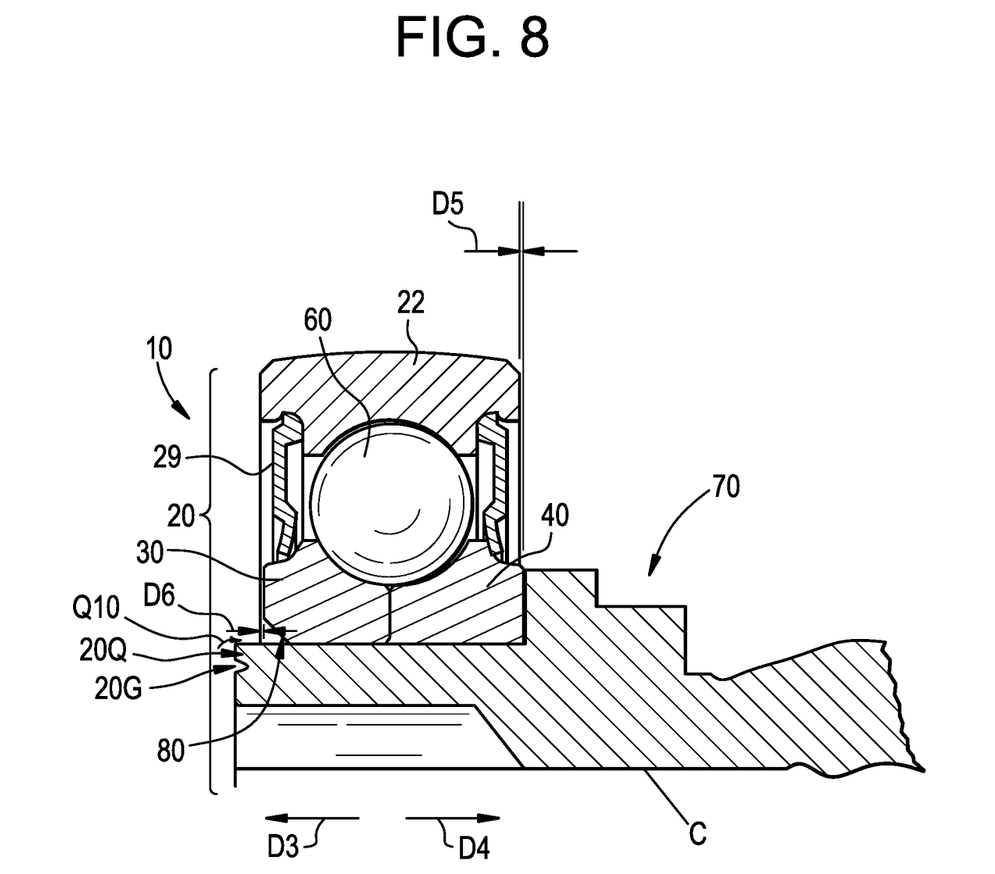
FIG. 8 is partial split cross sectional and front view of the cam follower assembly of FIG. 1.

As shown in FIG. 8 the first inner segment 30 is secured to the shaft 70 by staking at a staking area 80. If the first inner segment 30 is under staked (i.e., staked too loosely), it will result in separation of the first inner segment 30 and the second inner segment 40. In particular, if under staked, separation of the first inner segment 30 and the second inner segment 40 from one another occurs in directions D3 and D4 respectively. Directions D3 and D4 are parallel relative to the centerline C of the bearing 10. If the first inner segment 30 is over staked (i.e., staked too tightly), it will result in the first inner segment 30 and the second inner segment 40 moving towards each other in directions opposite of directions D3 and D4. It is preferred that the first inner segment 30 is secured to the shaft 70 by staking to create an axial looseness between the inner segments 30, 40 and the outer ring 22, as shown by distances $D_4$ and $D_5$. In one embodiment, the sum of distance D6 and distance D5 is between about 0.00508 mm (0.0002) inches to about 0.0508 mm (0.0020) inches. In one embodiment, a staking groove 20G is provided in the distal end 70D so that a portion 20Q of the distal end 70D is plastically deformed into the staking area 80 as indicated by the arrow Q10 in FIG. 8.

As best shown in FIG. 3, the outer ring 22 has a crowned exterior surface 22E, for example, an arcuate surface having a radius of curvature. As shown in FIG. 1, the crowned exterior surface 22E is symmetrical between the first axial end 22A and the second axial end 22B of the outer ring 22.

As best shown in FIG. 3, each of the plurality of balls 60 has a radius R1 extending from a center 60C of the ball 60. The centers 60C of the plurality of balls 60 trace a reference circle around the inner assembly 50. The centers 60C of the balls 60 are aligned along a common radially extending reference plane P1. The first radially inward facing bearing surface 26A has a first radius of curvature R2 that extends from a first origin C2 located radially inward from the reference circle and axially offset (i.e., in the direction of the arrow K1) from the reference plane P1 towards the second inner segment 40. The second radially inward facing bearing surface 26B has a second radius of curvature R3 that extends from a second origin C3 located radially inward from the reference circle and axially offset (i.e., in the direction of the arrow K2) from the reference plane P1 towards the first inner segment 30, such that the first recessed surface 26C, the first radially inward facing bearing surface 26A and the second radially inward facing bearing surface 26B form a first gothic arch cross sectional configuration.

As shown in FIG. 4, the first radially outward facing bearing surface 32 has a third radius of curvature R4 that extends from a third origin C4 located radially outward from the reference circle and axially offset (i.e., in the direction of the arrow K1) from the reference plane P1 towards the second inner segment 40. The second radially outward facing bearing surface 42 has a fourth radius of curvature R5 that extends from a fourth origin C5 located radially outward from the reference circle and axially offset (i.e., in the direction of the arrow K2) from the reference plane P1 towards the first inner segment 30, such that the second recessed surface 50C, 50C', the first radially outward facing bearing surface 32 and the second radially outward facing bearing surface 42 form a second gothic arch cross section configuration. The first gothic arch and the second gothic arch are configured to accommodate external loads applied to the ball bearing 20 due to misalignment as described herein.

Figure 5:
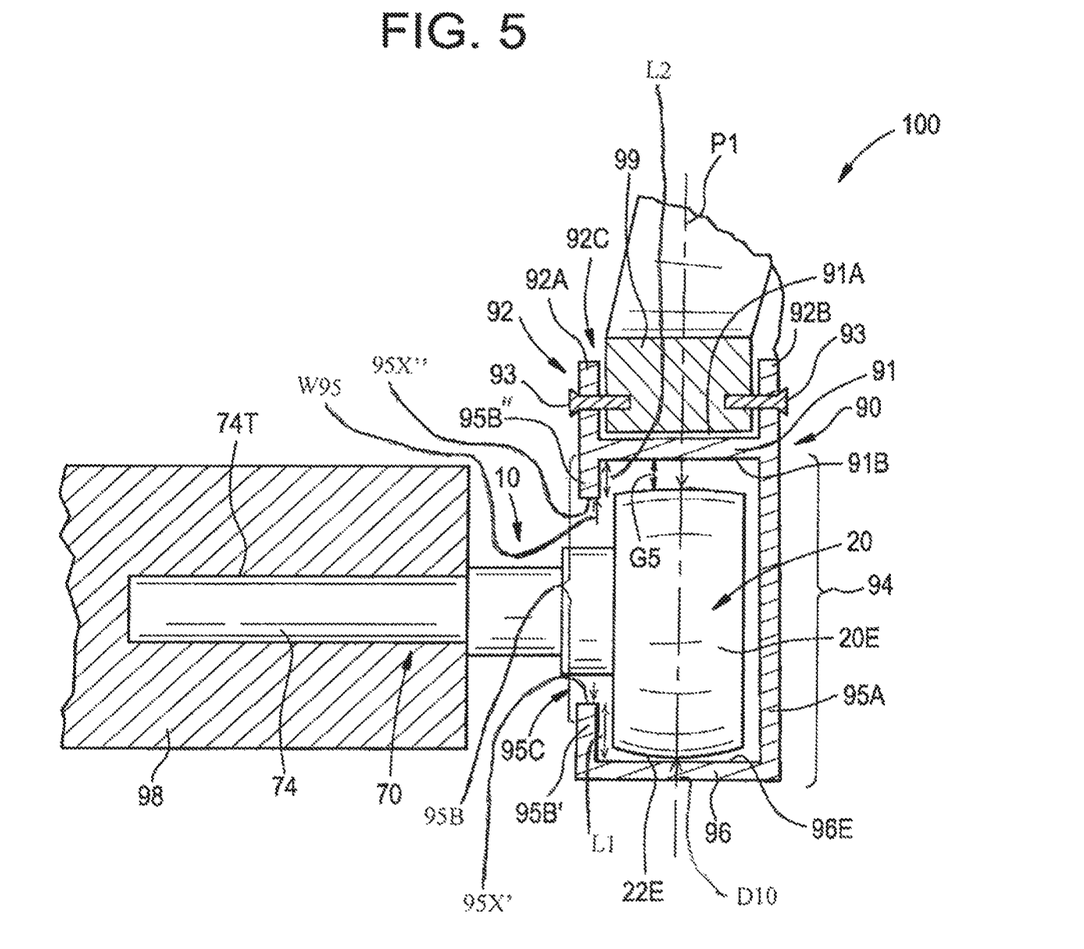
FIG. 5 is a cross sectional view of the cam follower assembly of the present invention shown installed in an aircraft seat structure and track for a seat of an aircraft, shown in an unloaded state.

As shown in FIG. 5, a track roller bearing assembly 100 includes a frame 90. The frame 90 has a base section 91 having a first side 91A and a second side 91B opposite the first side 91A. A connection section 92 extends outwardly from the first side 91A and has two legs 92A and 92B that form a channel 92C therebetween. The connection section 92 is secured to a seat rail 99 (e.g., a seat rail of a slidable aircraft seat) with fasteners 93. A track 94 extends from the second side 91B. The second side 91B is spaced apart from the exterior surface 22E of the outer ring 22 by a gap G5. The track 94 has a first bearing containment member 95A and a second bearing containment member 95B that extends outwardly from the second side 91B. The first bearing containment member 95A and the second bearing containment member 95B are spaced apart from one another. The first bearing containment member 95A has a leg 96 extending therefrom. The leg 96 has a rolling engagement surface 96E thereon. The rolling engagement surface 96E is substantially parallel to and faces the second side 91B. A portion of the second containment member 95B includes a first lip 95B' that extends away from the leg 96, towards the second side 91B. The second containment member 95B includes a second lip 95B" that extends away from the second side 91B towards the first lip 95B'. The first lip 95B' terminates at a first edge 95X' and the second lip 95B" terminates at a second edge 95X". The second bearing containment member 95B has an opening 95C between the first edge 95X' and the second edge 95X". The opening 95C defines a slot width W95 between the first edge 95X' and the second edge 95X". The outer ring 22 of the ball bearing 20 has an outside diameter D10 which is greater than the slot width W95. The first lip 95B' has a first length L1 and the second lip 95B" has a second length L2. The second length L2 is less than the first length L1.

Figure 6:
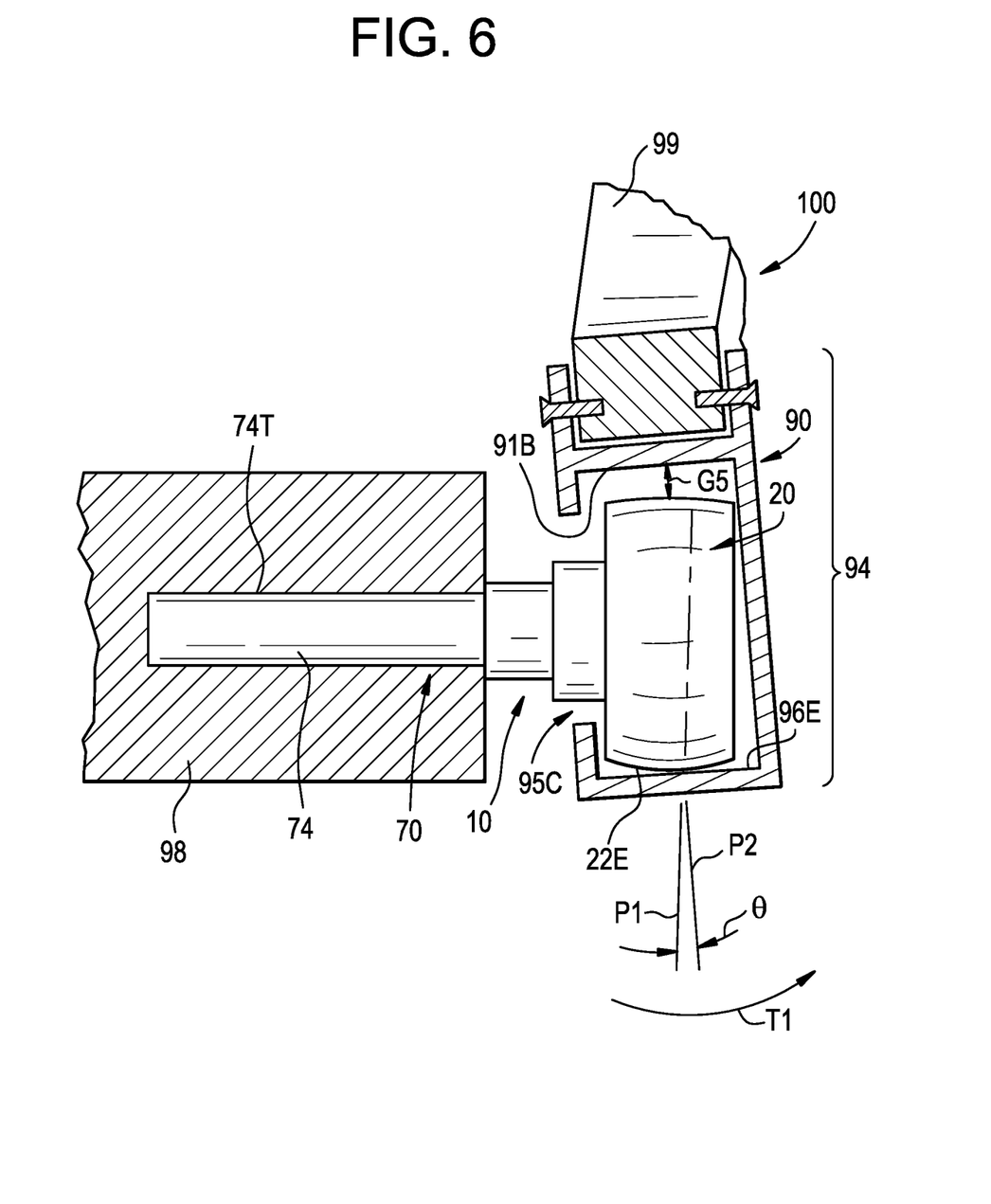
FIG. 6 is a cross sectional view of the cam follower assembly of the present invention shown installed in an aircraft structure and track for a seat of an aircraft, shown in an asymmetrically loaded state with the track misaligned relative to the ball bearing.

As shown in FIGS. 5 and 6, the mounting portion 74 of the cam follower assembly 10 is secured to a structural seat member 98 of the aircraft. The track 94 guides the outer ring 22 of the cam follower assembly 10 as the ball bearing 20 rolls in the track 94 (i.e., the exterior surface 22E of the outer ring 22 in rolling contact with the rolling engagement surface 96E) when the structural seat member 98 moves during adjustment of the position of the aircraft seat. If loads on the seat are below a predetermined threshold, the rolling contact between the exterior surface 22E of the outer ring 22 and the rolling engagement surface 96E are aligned along the reference plane P1. The mounting portion 72 of the shaft 70 extends through the opening 95C between the second containment member 95B and the lip 95B', such that the exterior surface 22E of the outer ring 22 rollingly engages the rolling engagement surface 96E.

As shown in FIG. 6, the exterior surface 22E is configured to accommodate misalignment of the frame 90 relative to the ball bearing 20 by maintaining rolling engagement of the exterior surface 22E with the rolling engagement surface 96E during such misalignment. For example, as shown in FIG. 6, when a load is applied to the seat, a torque T1 is applied to the structural seat member 98 so that the frame 90 is misaligned relative to the ball bearing 20 such that a central plane P2 of the frame 90 is angularly displaced by an angle θ relative to the reference plane P1. With a load applied to the seat, rolling contact between the exterior surface 22E of the outer ring 22 and rolling engagement surface 96E are aligned along the reference plane P2. In the misaligned configuration or upon application of axial loads to the structural seat member 98, the axial ends 22A and 22B of the outer ring 22 slidingly engage and are retained by inside surfaces of the first bearing containment member 95A, the second bearing containment member 95B and the lip 95B'. In one embodiment, one or more spacers (e.g., metal discs or rings or lubricious pads, rings or discs) are disposed between: 1) the axial end 22A and the inside surface of the first bearing containment member 95A; and/or 2) the axial end 22B and the inside surface of the second bearing containment member 95B and/or the lip 95B'.

The ball bearing 20 accommodates the misalignment of the frame 90 relative to the ball bearing 20 by transferring load applied to the outer ring 22 by the seat rail 99 to a two point contact with the balls 60 and the outer ring 22 at circumferential lines of contact X1 and X2 and from the balls 60 and the inner assembly 50 at circumferential lines of contact Y1 and Y2 (shown in FIGS. 3 and 4).

Figure 7:
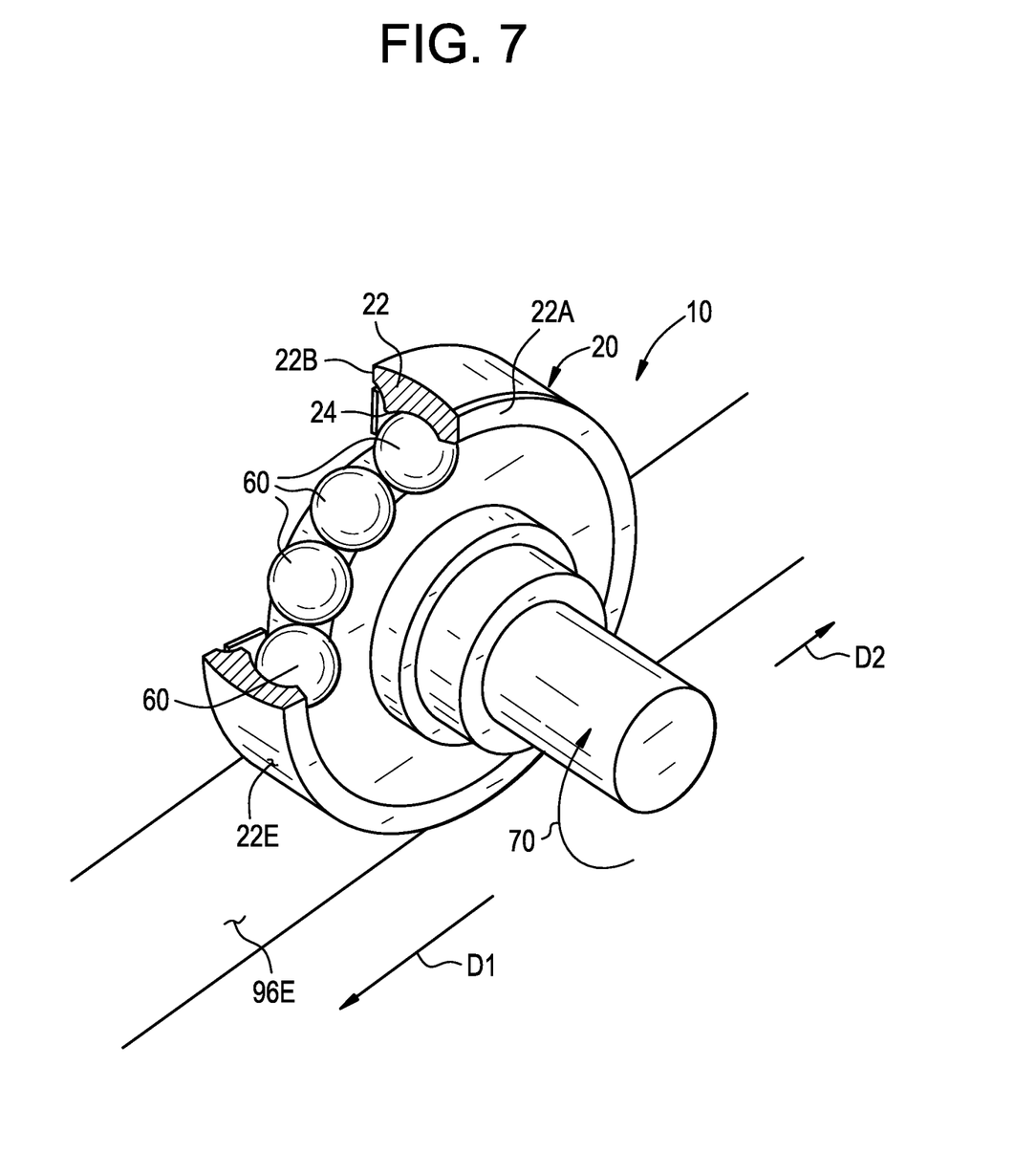
FIG. 7 is a perspective view of the cam follower assembly of FIG. 2 rollingly engaged with a surface of a track for a seat of an aircraft.

The ball bearing 20 facilitates movement of the cam follower assembly 10 a distance along the rolling engagement surface 96E of the track 94. As shown in FIG. 7, the cam roller assembly 10 can move in a first direction $D_1$ and a second direction $D_2$ along the rolling engagement surface 96E. In one embodiment, the cam follower assembly 10 moves a distance between about 2.0 inches to about 3.0 inches in either first direction $D_1$ or second direction $D_2$. In another embodiment, the cam follower assembly 10 moves a distance between about 2.5 inches to about 3.0 inches in either first direction $D_1$ or second direction $D_2$. The ball bearing 20 is subject to multiple revolutions during use of the cam follower assembly 10. When the cam follower assembly 10 moves a distance between about 2.5 inches to about 3.0 inches, the outer ring 22 undergoes between about 1 to about 1.5 revolutions.

The present invention also includes a method for assembling a cam follower assembly 10. The method includes providing an outer ring 22, an inner assembly 50 having at least two inner segments 30, 40, a plurality of balls 60 and a shaft 70 having a shoulder 76 formed thereon. Each of the outer ring 22 and at least two inner segments 30, 40 has a gothic arch shaped bearing surface (i.e., the first gothic arch configuration including the first recessed surface 26C, the first radially inward facing bearing surface 26A and the second radially inward facing bearing surface 26B, as shown in FIG. 3; and the second gothic arch configuration including the second recessed surface 50C, 50C', the first radially outward facing bearing surface 32 and the second radially outward facing bearing surface 42, as shown in FIG. 4) therein. The method includes disposing the second inner segment 40 in the outer ring 22. The method includes installing a full complement of balls 60 between the outer ring 22 and the second inner segment 40 so that the balls 60 engage a portion of the bearing surface (e.g., the second radially outward facing bearing surface 42, the first radially inward facing bearing surface 26A and the second radially inward facing bearing surface 26B). The method includes disposing the first inner segment 30 in the outer ring 22 so that the balls 60 are retained between the outer ring 22 and the inner assembly 50 and so that the balls engage the first radially outward facing bearing surface 32. The method includes disposing the outer ring 22 and inner assembly 50 with the full complement of balls 60 therein on the shaft 70 such that the second inner segment 40 engages the shoulder 76 and the first inner segment and the second inner segment abut against each other. The method includes securing first inner segment 30 to the shaft 70.

Although the invention has been described with reference to particular embodiments thereof, it will be understood by one of ordinary skill in the art, upon a reading and understanding of the foregoing disclosure that numerous variations and alterations to the disclosed embodiments will fall within the scope of this invention and of the appended claims.

What is claimed is:

1. A track roller bearing assembly comprising:
a frame comprising:
  a base section having a first side and a second side opposite the first side;
  a connection section extending outwardly from the first side, the connection section having at least one first leg;
  a track extending from the second side, the track having a first bearing containment member extending outwardly from the second side, the track having a second bearing containment member located opposite the first bearing containment member and being spaced apart from the first bearing containment member, the first bearing containment member being parallel to the second bearing containment member and parallel to a central plane of the frame, the first bearing containment member has a second leg extending therefrom, the second leg having a rolling engagement surface thereon, the rolling engagement surface being substantially parallel to and facing the second side, the second bearing containment member having a first lip that extends away from the second leg towards the second side, the first lip terminating at a first edge thereof, the second containment member having a second lip that extends away from the second side towards the first lip, the second lip terminating at a second edge, the second bearing containment member has an opening between the first edge and the second edge, the opening defining a slot width between the first edge and the second edge;
a cam follower assembly comprising:
  a ball bearing comprising:
    an outer ring having a crowned exterior surface that defines an outside diameter and an interior area, the interior area being defined by an inner surface extending between a first axial end and a second axial end of the outer ring, the crowned exterior surface being symmetrical between the first axial end and the second axial end, the inner surface having a first radially inward facing bearing surface and a second radially inward facing bearing surface and a radially outward extending and inwardly facing first recessed surface therebetween;
    an inner assembly extending into the interior area, the inner assembly comprising a first inner segment extending from a third axial end to a fourth axial end thereof and a second inner segment extending from a fifth axial end to a sixth axial end thereof, the first inner segment having a first radially outward facing bearing surface and the second inner segment having a second radially outward facing bearing surface, the fourth axial end and the fifth axial end being abutted against each other and a radially inward extending and radially outward facing second recessed surface between the first radially outward facing bearing surface and the second radially outward facing bearing surface; and
    a plurality of balls positioned in the interior area between and in rolling engagement with the first radially inward facing bearing surface and the second radially inward facing bearing surface and the first radially outward facing bearing surface and the second radially outward facing bearing surface, the plurality of balls rollingly engaging each other to form a full complement of the plurality of balls and being spaced apart from the first recessed surface and the second recessed surface, each of the balls having a radius extending from a ball-center thereof, the ball-centers being aligned along a common radially extending reference plane;
  a shaft having a bearing receiving portion and a mounting portion extending from the bearing receiving portion; and
  the ball bearing being disposed on the bearing receiving area such that the inner assembly is secured to the shaft; and
the outside diameter of the outer ring being greater than the slot width such that the bearing is contained in the track with the mounting portion extending through the opening in the second bearing containment member such that the crowned exterior surface of the outer ring rollingly engages the rolling engagement surface, the crowned exterior surface being configured to accommodate misalignment of the frame relative to the ball bearing by maintaining rolling engagement of the crowned exterior surface with the rolling engagement surface during such misalignment, the misalignment being defined by the frame being misaligned relative to the ball bearing such that the central plane of the frame is angularly displaced relative to the reference plane in response to a torque applied to the shaft, such that the first axial end of the outer ring slidingly engages and is retained by the first lip, and the second axial end of the outer ring slidingly engages and is retained by the first bearing containment member.

2. The track roller bearing assembly of claim 1, further comprising a shoulder positioned between the bearing receiving portion and the mounting portion, the shoulder extending radially outward from and circumferentially around the shaft and the second inner segment abutting an axial face of the shoulder.

3. The track roller bearing assembly of claim 1, wherein the first inner segment is secured to the shaft.

4. The track roller bearing assembly of claim 3, wherein the first inner segment is secured to the shaft by at least one of swaging, staking, pinning, a thermal fit and an interference press fit.

5. The track roller bearing assembly of claim 1, wherein the crowned surface comprises an arcuate shape having a radius of curvature.

6. The track roller bearing assembly of claim 1, further comprising at least one seal extending between the outer ring and the inner assembly.

7. The track roller bearing assembly of claim 1, wherein the mounting portion comprises a threaded area.

8. The track roller bearing assembly of claim 1, wherein the centers of the plurality of balls trace a reference circle around the inner assembly;
the first radially inward facing bearing surface having a first radius of curvature extending from a first origin located radially inward from the reference circle and axially offset from the reference plane towards the second inner segment, the second radially inward facing bearing surface having a second radius of curvature extending from a second origin located radially inward from the reference circle and axially offset from the reference plane towards the first inner segment, such that the first recessed surface, the first radially inward facing bearing surface and the second radially inward facing bearing surface form a first gothic arch cross sectional configuration;
the first radially outward facing bearing surface having a third radius of curvature extending from a third origin located radially outward from the reference circle and axially offset from the reference plane towards the second inner segment, the second radially outward facing bearing surface having a fourth radius of curvature extending from a fourth origin located radially outward from the reference circle and axially offset from the reference plane towards the first inner segment, such that the second recessed surface, the first radially outward facing bearing surface and the second radially outward facing bearing surface form a second gothic arch cross section configuration; and
wherein the first gothic arch and the second gothic arch are configured to accommodate external loads applied to the ball bearing due to misalignment of the frame relative to the ball bearing.

9. A track roller bearing assembly comprising:
a frame comprising:
a base section having a first side and a second side opposite the first side;
a connection section extending outwardly from the first side, the connection section having at least one first leg;
a track extending from the second side, the track having a first bearing containment member extending outwardly from the second side, the track having a second bearing containment member located opposite the first bearing containment member and being spaced apart from the first bearing containment member, the first bearing containment member has a second leg extending therefrom, the second leg having a rolling engagement surface thereon the rolling engagement surface being substantially parallel to and facing the second side, the second bearing containment member having a first lip that extends away from the second leg towards the second side, the first lip terminating at a first edge thereof, the second containment member having a second lip that extends away from the second side towards the first lip, the second lip terminating at a second edge, the second bearing containment member has an opening between the first edge and the second edge, the opening defining a slot width between the first edge and the second edge;
a cam follower assembly comprising:
a ball bearing comprising:
an outer ring having an exterior surface that defines an outside diameter and an interior area, the interior area being defined by an inner surface extending between a first axial end and a second axial end of the outer ring, the inner surface having a first radially inward facing bearing surface and a second radially inward facing bearing surface and a radially outward extending and inwardly facing first recessed surface therebetween;
an inner assembly extending into the interior area, the inner assembly comprising a first inner segment extending from a third axial end to a fourth axial end thereof and a second inner segment extending from a fifth axial end to a sixth axial end thereof, the first inner segment having a first radially outward facing bearing surface and the second inner segment having a second radially outward facing bearing surface, the fourth axial end and the fifth axial end being abutted against each other and a radially inward extending and radially outward facing second recessed surface between the first radially outward facing bearing surface and the second radially outward facing bearing surface; and
a plurality of balls positioned in the interior area between and in rolling engagement with the first radially inward facing bearing surface and the second radially inward facing bearing surface and the first radially outward facing bearing surface and the second radially outward facing bearing surface, the plurality of balls rollingly engaging each other to form a full complement of the plurality of balls and being spaced apart from the first recessed surface and the second recessed surface;
a shaft having a bearing receiving portion and a mounting portion extending from the bearing receiving portion; and
the ball bearing being disposed on the bearing receiving area such that the inner assembly is secured to the shaft and
the outside diameter of the outer ring being greater than the slot width such that the bearing is contained in the track with the mounting portion extending through the opening in the second bearing containment member such that the exterior surface of the outer ring rollingly engages the rolling engagement surface, the exterior surface being configured to accommodate misalignment of the frame relative to the ball bearing by maintaining rolling engagement of the exterior surface with the rolling engagement surface during such misalignment, the misalignment being defined by the frame being misaligned relative to the ball bearing such that a central plane of the frame is angularly displaced relative to a reference plane in response to a torque applied to the shaft; and wherein the first lip has a first length and the second lip has a second length, the second length being less than the first length.

\* \* \* \* \*